(12) United States Patent
Matsumoto et al.

(10) Patent No.: US 10,007,083 B2
(45) Date of Patent: Jun. 26, 2018

(54) LENS BARREL

(71) Applicant: Olympus Corporation, Shibuya-ku, Tokyo (JP)

(72) Inventors: Naoki Matsumoto, Hachioji (JP); Kyoji Murayama, Hachioji (JP)

(73) Assignee: Olympus Corporation, Tokyo (JP)

( * ) Notice: Subject to any disclaimer, the term of this patent is extended or adjusted under 35 U.S.C. 154(b) by 30 days.

(21) Appl. No.: 14/828,809

(22) Filed: Aug. 18, 2015

(65) Prior Publication Data

US 2016/0054539 A1 Feb. 25, 2016

Related U.S. Application Data

(60) Provisional application No. 62/041,366, filed on Aug. 25, 2014.

(51) Int. Cl.
*G02B 7/02* (2006.01)
*G02B 7/10* (2006.01)

(52) U.S. Cl.
CPC .................... *G02B 7/102* (2013.01)

(58) Field of Classification Search
CPC ... G02B 7/00; G02B 7/02; G02B 7/04; G02B 7/06; G02B 7/08–7/10

USPC ........ 359/512–513, 811, 813, 819–826, 829, 359/830
See application file for complete search history.

(56) References Cited

U.S. PATENT DOCUMENTS

| 7,050,244 | B2* | 5/2006 | Hayashi | G02B 7/102 359/698 |
| 2005/0057822 | A1* | 3/2005 | Hayashi | G02B 7/10 359/694 |
| 2010/0214679 | A1* | 8/2010 | Iikawa | G02B 7/10 359/825 |

FOREIGN PATENT DOCUMENTS

| JP | 2004-093612 | 3/2005 |
| JP | 2007-047411 | 2/2007 |

* cited by examiner

*Primary Examiner* — Robert E Tallman
(74) *Attorney, Agent, or Firm* — John C. Pokotylo; Pokotylo Patent Services (57) ABSTRACT

A lens barrel of the invention is configured with a first barrel member, a second barrel member which rotates around an outer periphery of the first barrel member and which has a through hole between an outer peripheral surface and an inner peripheral surface, and a moisture permeable member provided so as to cover the through hole of the second barrel member.

4 Claims, 9 Drawing Sheets

LENS BARREL

BACKGROUND OF THE INVENTION

1. Field of the Invention

The present invention relates generally to a lens barrel provided with a rotation operation member and having drip-proofness.

2. Description of the Related Art

Recently, image pickup apparatuses, such as digital cameras and video cameras, have been put to practical use and have been widespread which are configured to be capable of sequentially performing photoelectric conversion of an optical image formed by an image pickup optical system, using a photoelectric conversion device (hereinafter referred to as an image pickup device), such as a CCD (charge coupled device) type image sensor and a CMOS (complementary metal oxide semiconductor) type image sensor, storing an image signal acquired thereby into a storage medium as image data in a predetermined form (for example, digital image data indicating a still image or a movie), and displaying the still image or the movie on the basis of the digital image data on an image display apparatus such as an LCD (liquid crystal display) device and an OEL (organic electro-luminescence) display device. Furthermore, among image pickup apparatuses of this kind, those having dust-proofness and drip-proofness realized by providing a sealing structure between an exterior and an interior have been widespread.

Further, among conventional image pickup apparatuses, those provided with an image pickup optical system configured to have variable magnifications, a so-called zoom optical system, have been widespread. A lens barrel including such an image pickup optical system having variable magnifications (a zoom optical system) (hereinafter referred to as a zoom lens barrel) is configured with a plurality of cylindrical members, and a variable magnification function is realized by relatively extending and contracting each cylindrical member in an optical axis direction. Furthermore, recently, there is a tendency that a variable magnification rate of the zoom optical system is more and more increased.

Generally, in a zoom lens barrel, when a zooming operation or the like is performed, each cylindrical member relatively moves forward or backward in an optical axis direction, and, therefore, an internal volume at a time of being contracted and an internal volume at a time of being extended are significantly different from each other. Therefore, for example, in a lens barrel with a watertight structure, when a zooming operation causing change in the internal volume is performed, a heavy load accompanying the zooming operation or the like is imposed on the cylindrical members and sealing members because the structure is such that entrance and exit of air between inside and outside of the cylindrical members are difficult. Therefore, various devices for, even for a lens barrel with a watertight structure, securing entrance and exit of air between the inside and outside of the cylindrical members by a zooming operation or the like to provide air permeability and preventing entrance and exit of water drops and the like to secure drip-proofness have been proposed, for example, by Japanese Patent Application Laid-Open Publication No. 2007-47411 and Japanese Patent No. 4035402.

A lens barrel disclosed by Japanese Patent Application Laid-Open Publication No. 2007-47411 is configured by providing an air hole passing between internal and external spaces in a partial area of a fixed barrel, arranging a sheet member having air permeability and drip-proofness so as to cover the air hole, and providing an exterior member so as to cover the sheet member.

A lens barrel disclosed by Japanese Patent No. 4035402 is configured by using cam grooves or hole portions used to fix lenses as air holes and sticking drip-proof sheet members so as to cover the hole portions.

SUMMARY OF THE INVENTION

A lens barrel of the present invention is provided with a first barrel member, a second barrel member which rotates around an outer periphery of the first barrel member and which has a through hole between an outer peripheral surface and an inner peripheral surface, and a moisture permeable member provided so as to cover the through hole of the second barrel member.

Benefits of the present invention will be further apparent from detailed description below.

DETAILED DESCRIPTION OF THE PREFERRED EMBODIMENTS

An embodiment of the present invention is an example of applying the present invention to a lens barrel which is configured so as to be freely attached to and detached from an image pickup apparatus, such as a digital camera, which is configured, for example, to be capable of performing photoelectric conversion of an optical image formed by an optical lens using a solid-state image pickup device, converting an image signal obtained thereby to digital image data indicating a still image or a movie, recording the digital data generated in this way to a recording medium, and reproducing and displaying the still image or the movie based on the digital image data recorded in the recording medium on a display device, and which is a zoom lens barrel provided with an image pickup optical system having variable magnifications.

Note that each drawing used in description below is schematic, and dimensions, reduced scale and the like of each member may be shown different for each component so as to recognizably show each component on the drawing. Therefore, as for the number of components, shapes of the components, a ratio of sizes of the components, relative positional relationship among the respective components, and the like shown in each of the drawings, the present invention is not limited to the form shown in the drawing.

Figure 1:
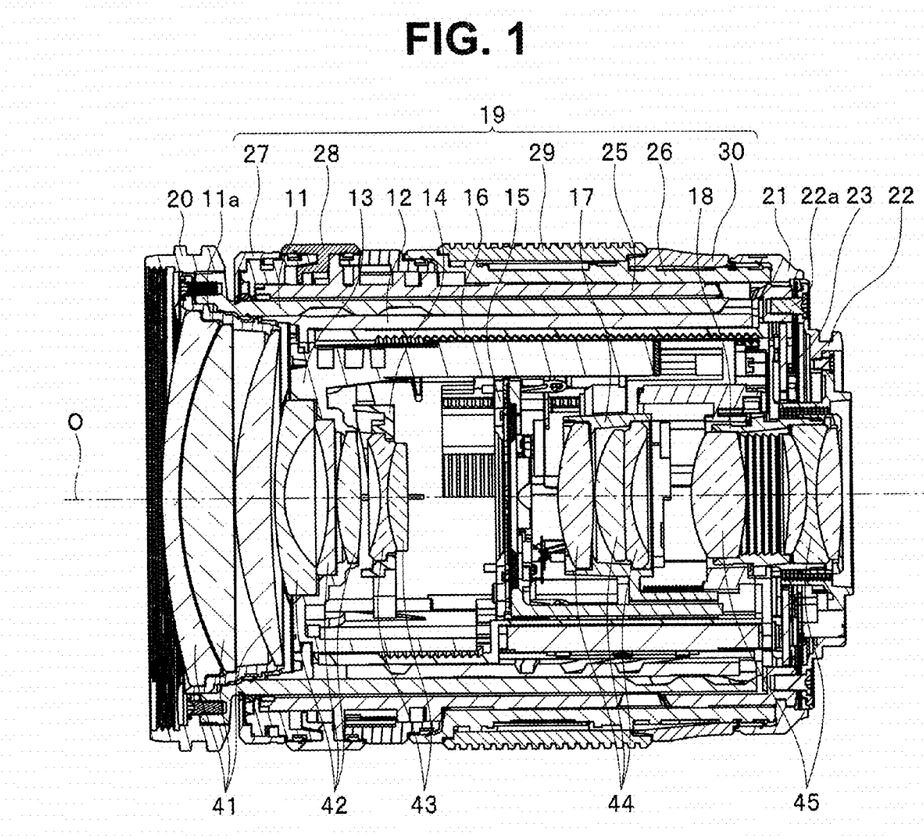
FIG. 1 is a longitudinal sectional view showing that a lens barrel of an embodiment of the present invention is in a state of being at a wide angle position.
Figure 2:
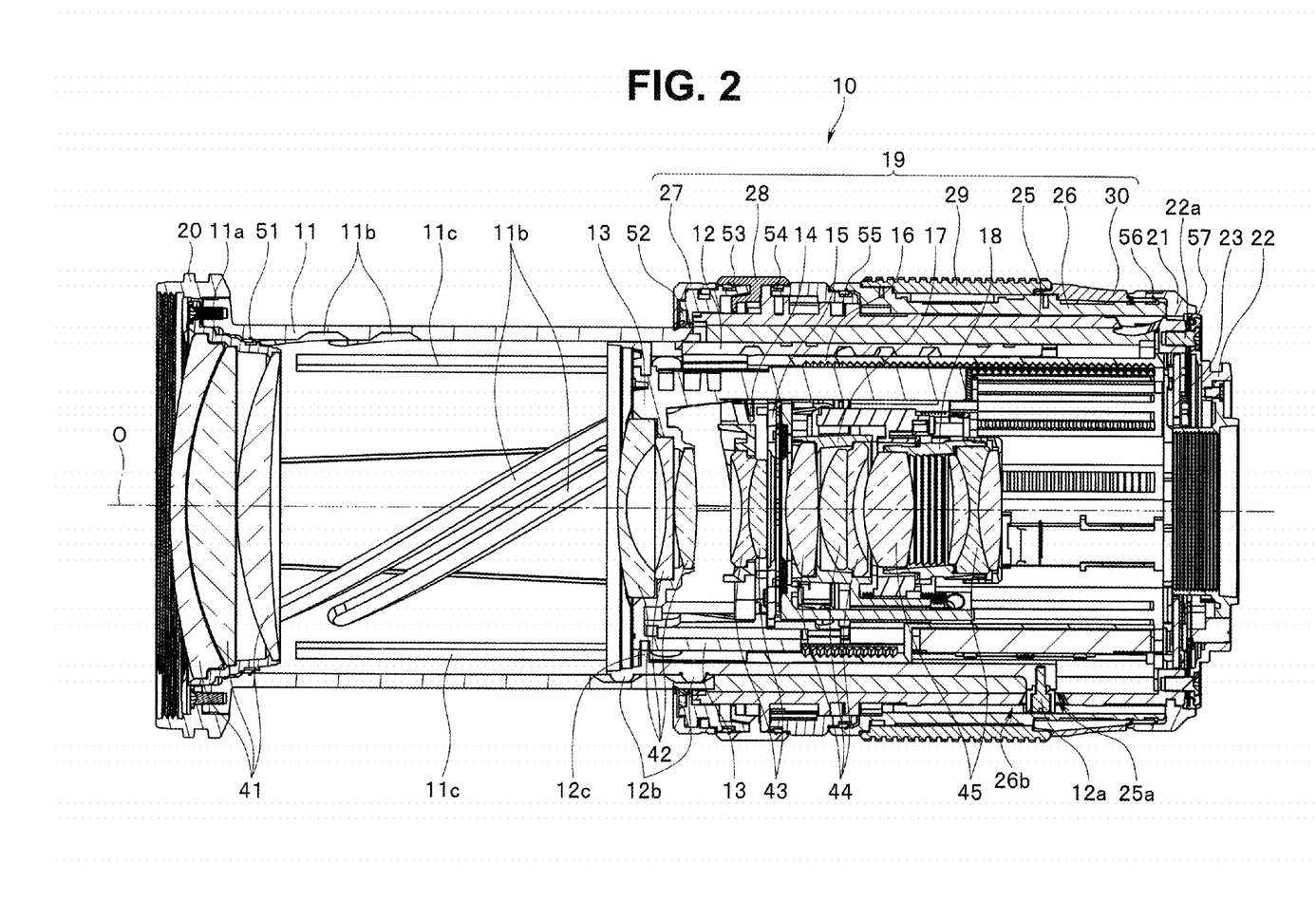
FIG. 2 is a longitudinal sectional view showing that the lens barrel of FIG. 1 is in a state of being at a tele angle position.
Figure 3:
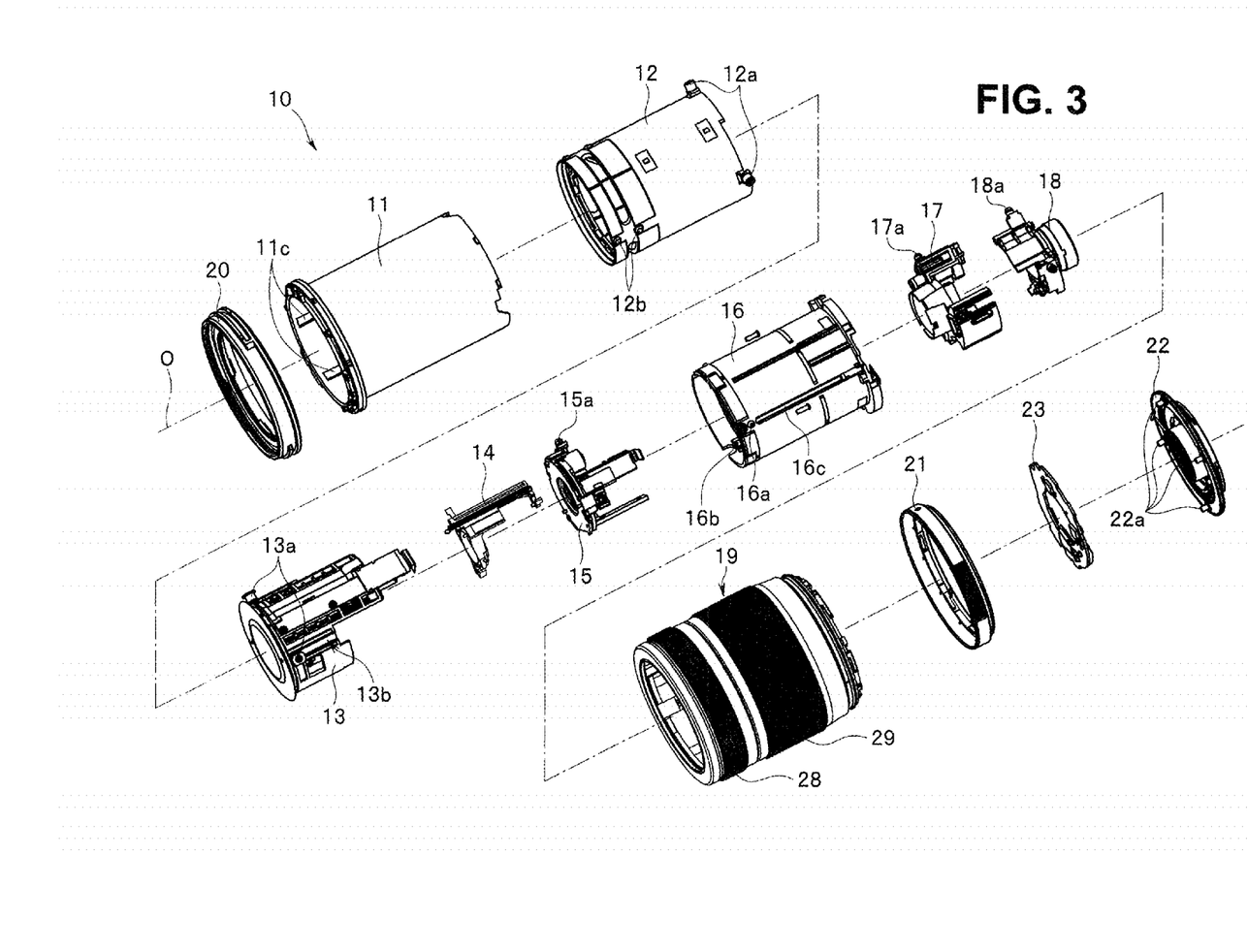
FIG. 3 is an exploded perspective view of the lens barrel of FIG. 1.
Figure 4:
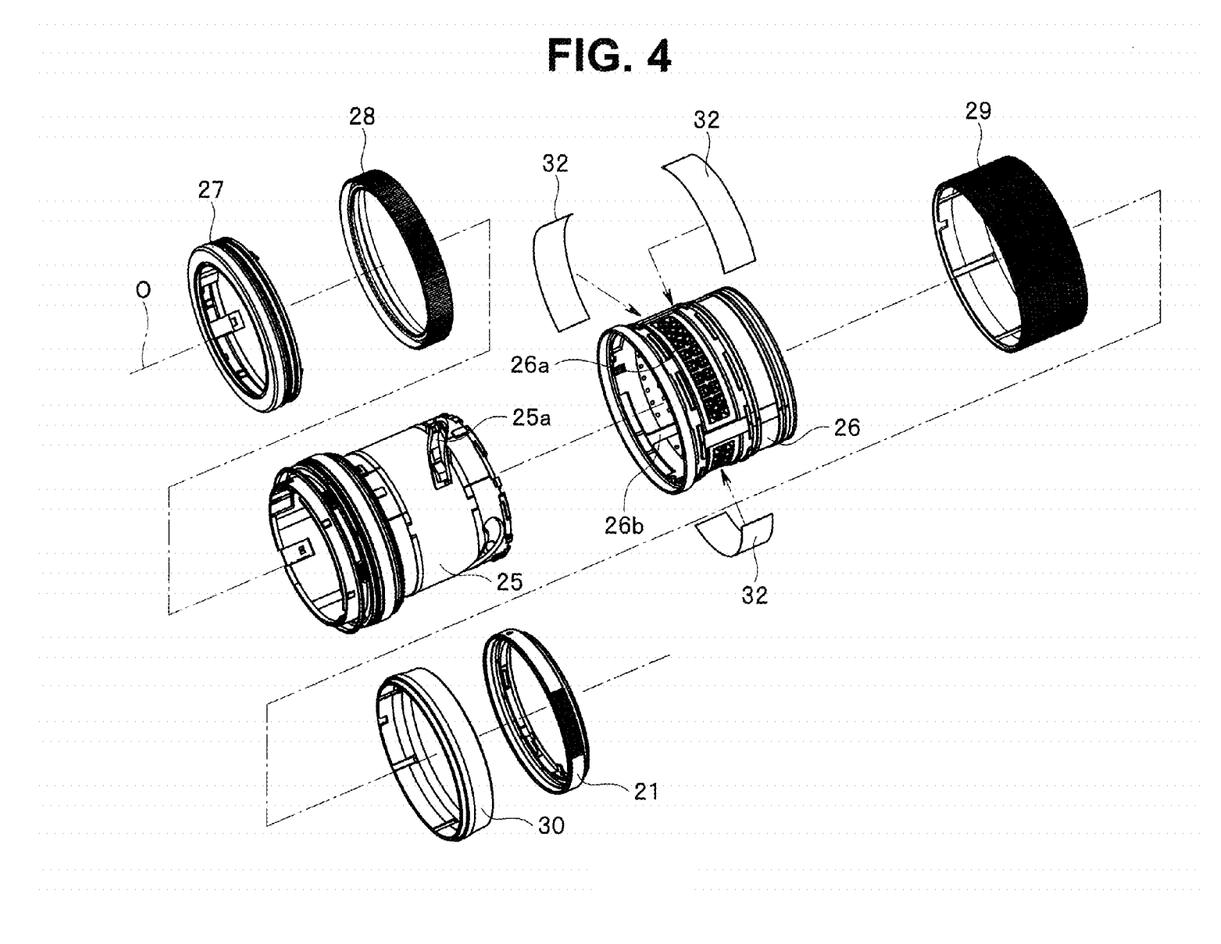
FIG. 4 is an exploded perspective view of an exterior barrel unit of the lens barrel of FIG. 1.
Figure 5:
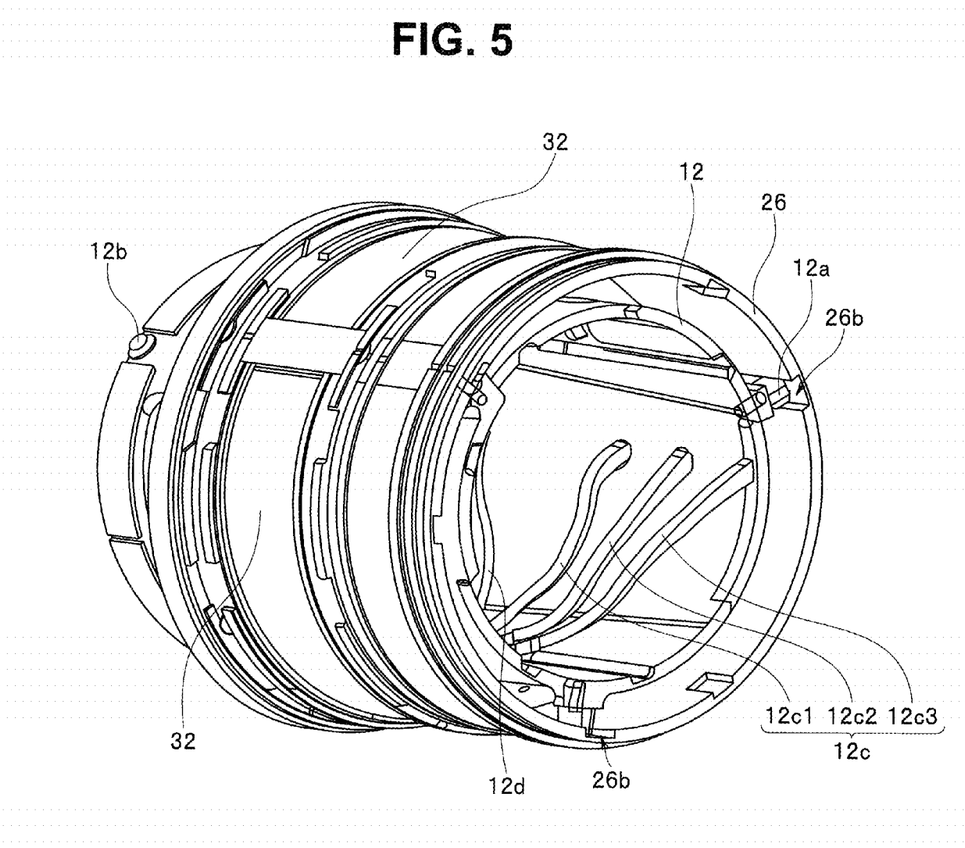
FIG. 5 is a perspective view showing a state of engagement between a cam barrel and a part (a zoom barrel) of the exterior barrel unit in the lens barrel of FIG. 1.
Figure 6:
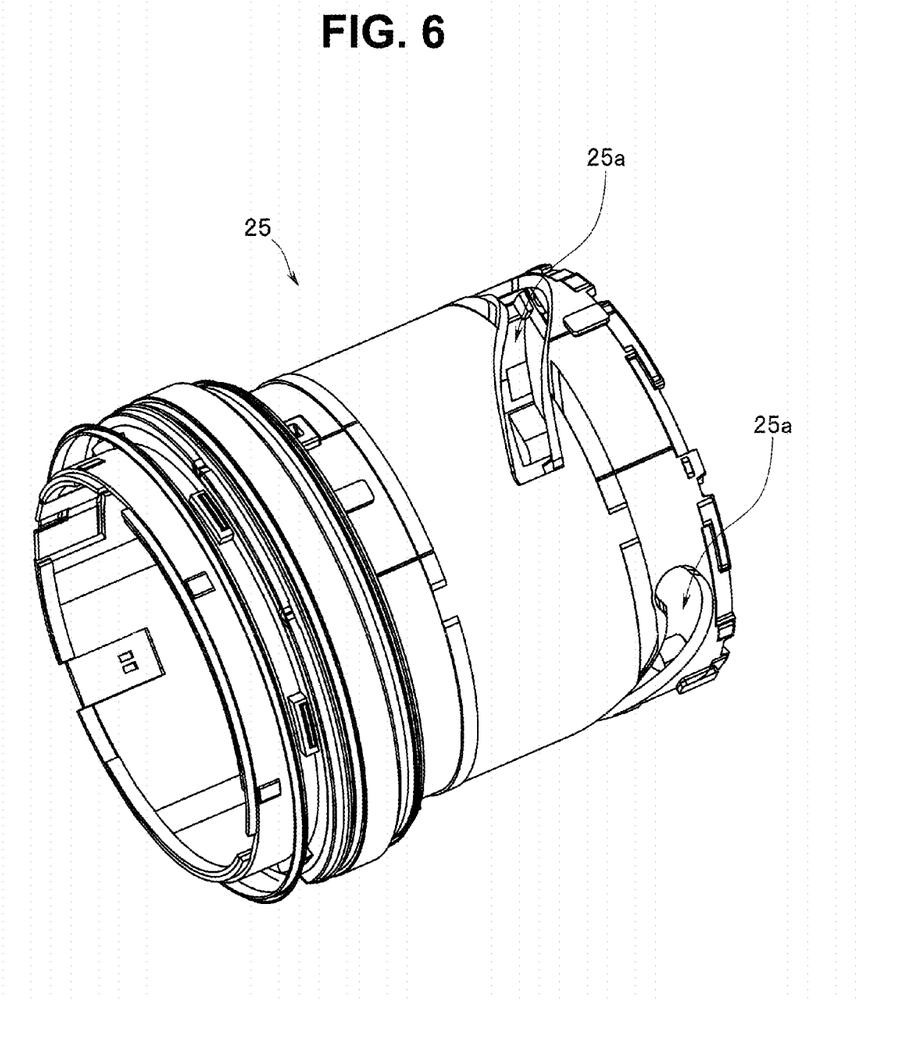
FIG. 6 is an enlarged perspective view in which only a body barrel of the exterior barrel unit of the lens barrel of FIG. 1 is taken out and shown.
Figure 7:
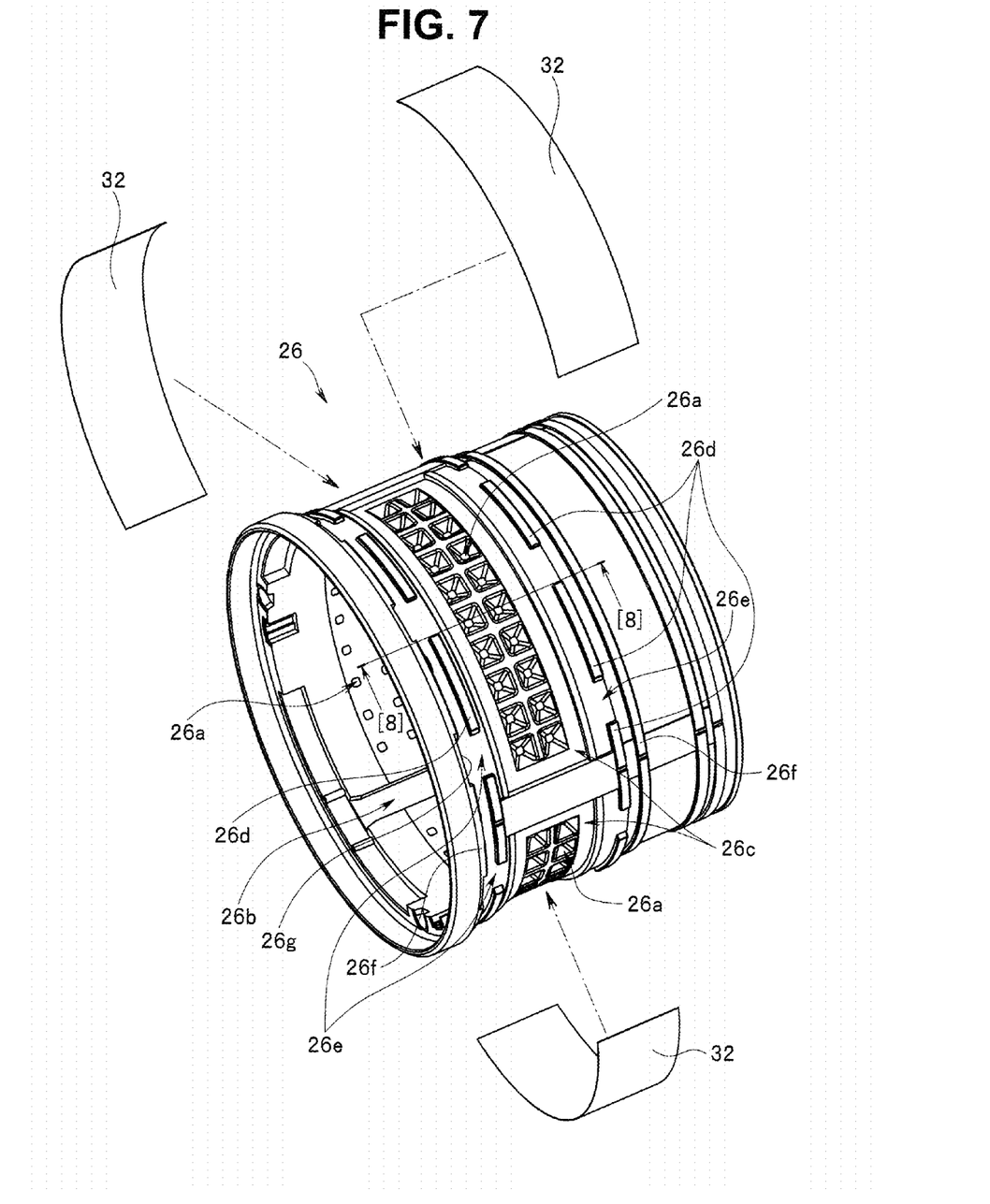
FIG. 7 is an enlarged perspective view in which the zoom barrel of the exterior barrel unit of the lens barrel of FIG. 1 and moisture permeable sheets stuck over air holes of the zoom barrel are taken out and shown.
Figure 8:
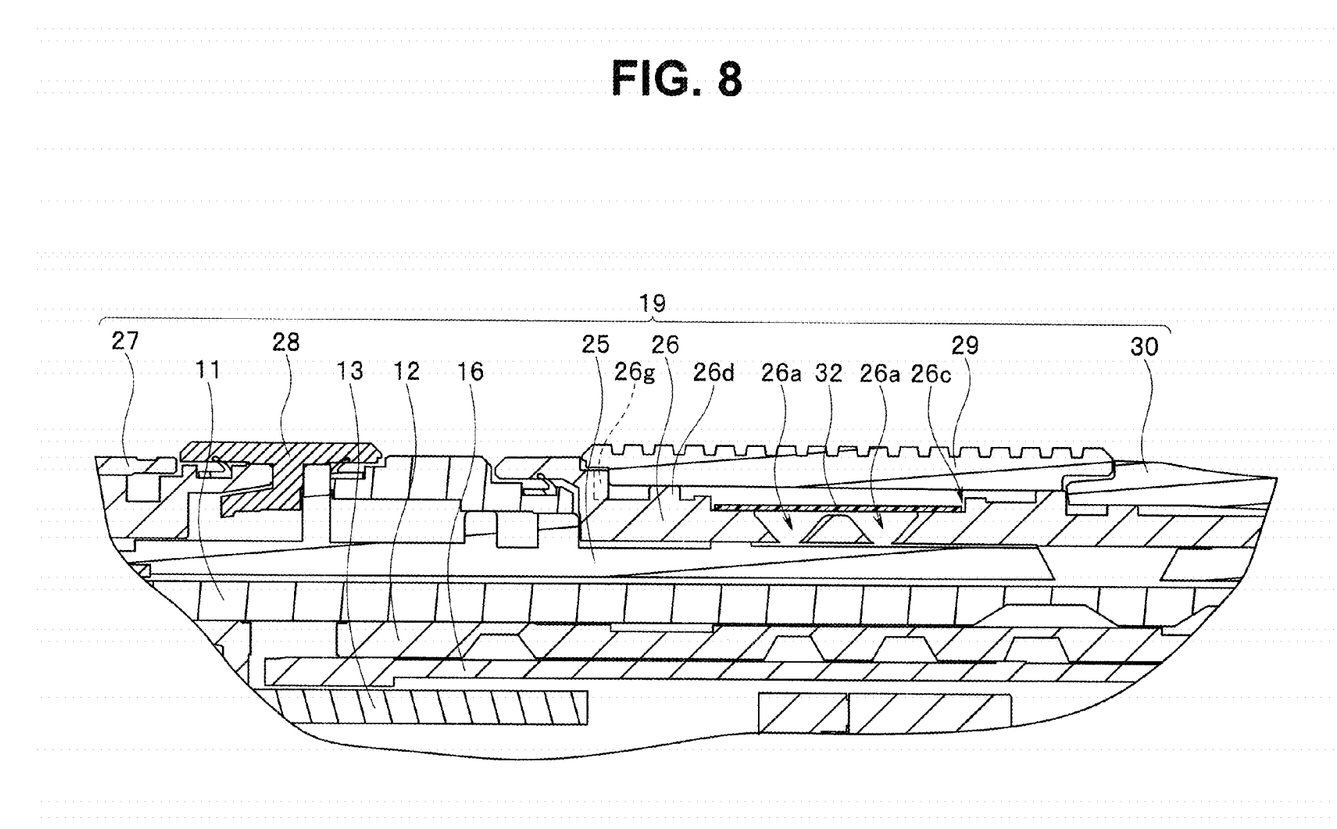
FIG. 8 is an enlarged longitudinal sectional view of main portions along a [8]-[8] line in FIG. 7.

FIGS. 1 and 2 are longitudinal sectional views of a lens barrel of an embodiment of the present invention. Between FIGS. 1 and 2, FIG. 1 shows that the lens barrel is in a state of being at a shortest focus position (a wide angle position) where the lens barrel is contracted shortest. FIG. 2 shows that the lens barrel is in a state of being at a longest focus position (a tele angle position) where the lens barrel is extended longest. FIG. 3 is an exploded perspective view of the lens barrel. FIG. 4 is an exploded perspective view of an exterior barrel unit of the lens barrel. FIG. 5 is a perspective view showing a state of engagement between a cam barrel and a part (a zoom barrel) of the exterior barrel unit in the lens barrel. FIG. 6 is an enlarged perspective view in which only a body barrel of the exterior barrel unit of the lens barrel is taken out and shown. FIG. 7 is an enlarged perspective view in which the zoom barrel of the exterior barrel unit of the lens barrel and moisture permeable sheets stuck over air holes of the zoom barrel are taken out and shown. FIG. 8 shows a section of a part (a region where the air holes are formed) of the exterior barrel unit of the lens barrel and is an enlarged longitudinal sectional view of main portions corresponding to a section along a [8]-[8] line in FIG. 7.

A lens barrel 10 of the embodiment of the present invention is configured such that it mainly includes: an image pickup optical system configured with a plurality of optical lenses; a plurality of lens holding members holding respective groups of the plurality of optical lenses constituting the image pickup optical system; a driving member constituting a driving mechanism for causing each of the plurality of lens holding members to separately move forward or backward in a direction along an optical axis O; an operation member which acts on the driving mechanism; a diaphragm device which adjusts an amount of light transmitted through the image pickup optical system by changing an opening diameter of the image pickup optical system; a mount member which couples an image pickup apparatus not shown to which the lens barrel 10 is applied and the lens barrel 10 with each other; an electrical substrate implemented with an electrical circuit which generally performs overall control and the like of the lens barrel 10; other decorative members and the like.

As for a specific configuration of the lens barrel 10, the lens barrel 10 is configured mainly with: a plurality of lens groups (41 to 45) configured with a plurality of lenses constituting the image pickup optical system; a plurality of lens holding members such as a first-group barrel 11, a second-group barrel 13, a third-group barrel 14, a fourth-group barrel 17 and a fifth-group barrel 18; driving members such as a cam barrel 12 and a fixed barrel 16; an exterior barrel unit 19 provided with a plurality of operation members; a diaphragm device 15, a mount member such as a mount ring 22; decorative members such as a front ring 20 and a rear-end exterior cover 21; an electrical substrate 23; and the like as shown mainly in FIGS. 1 to 4.

The image pickup optical system in the lens barrel 10 is configured, for example, with the plurality of lens groups (41, 42, 43, 44 and 45; see FIGS. 1 and 2). Each of the plurality of lens groups is configured with a plurality of optical lenses.

Among the plurality of lens groups, the first lens group 41 is held by a first-group holding barrel 11a. The first-group holding barrel 11a is fixedly arranged in a region close to a distal end of the first-group barrel 11 (see FIGS. 1 and 2). Note that the first-group holding barrel 11a is not shown in FIG. 3. The front ring 20, which is a decorative member covering a front of the first-group barrel 11, is fixedly arranged at a distal end part of the first-group barrel 11. Fitting portions, screw grooves and the like for mounting accessories such as a shading hood and an optical filter on a distal end region of the first-group barrel 11 are formed on the front ring 20.

The second lens group 42 is held by the second-group barrel 13. The second-group barrel 13 is integrally arranged in the direction along the optical axis O by bayonet coupling, in a distal end region of the cam barrel 12 in a state of freely rotating relative to the cam barrel 12 (to be described in detail later).

The third lens group 43 is held by the third-group barrel 14. The third-group barrel 14 is movably arranged in the second-group barrel 13 so as to be guided in the optical axis direction by a guide shaft provided parallel to the optical axis O. The third-group barrel 14 is arranged in a state of freely moving forward and backward in the optical axis O direction relative to the second-group barrel 13, by a driving source (a focus motor) and a screw fixedly arranged on the second-group barrel 13. That is, the third lens group 43 is an optical system which functions as a focus lens.

The fourth lens group 44 is held by the fourth-group barrel 17. Further, the fifth lens group 45 is held by the fifth-group barrel 18. The fourth-group barrel 17 and the fifth-group barrel 18 are inserted in a state of freely moving forward and backward in the direction along the optical axis O relative to the cam barrel 12. Therefore, the fourth-group barrel 17 and the fifth-group barrel 18 have cam pins 17a and 18a (see FIG. 3) engaged with corresponding grooves among a plurality of cam grooves 12c (12c1, 12c2 and 12c3; see FIG. 5) on an inner peripheral surface of the cam barrel 12, respectively.

The diaphragm device 15 is arranged between the third-group barrel 14 and the fourth-group barrel 17. The diaphragm device 15 is also inserted in a state of freely moving forward and backward in the direction along the optical axis O relative to the cam barrel 12, similarly to the fourth-group barrel 17 and the fifth-group barrel 18 described above. Therefore, the diaphragm device 15 has a cam pin 15a (see FIG. 3) engaged with a corresponding groove among the plurality of cam grooves 12c (12c1, 12c2 and 12c3; see FIG. 5) on the inner peripheral surface of the cam barrel 12.

The exterior barrel unit 19 is a component member arranged on an outermost periphery side of the lens barrel 10. On an outer peripheral surface of the lens barrel 10, a plurality of operation members, that is, a focusing ring 28 and a zoom ring 29, which are focus rings, are provided in a state of freely rotating. The exterior barrel unit 19 is a cylindrical member configured to be freely attached to and detached from the image pickup apparatus not shown to which the lens barrel 10 is applied and to be in a fixed state relative to the image pickup apparatus when being mounted on the image pickup apparatus.

Therefore, the mount ring 22 is fixedly arranged on a rear end surface of the exterior barrel unit 19 with the use of fastening members such as screws 22a. The mount ring 22 is a ring-shaped member which is, for example, bayonet-coupled with a mount ring (not shown) formed on an outer peripheral edge portion of a lens mount opening portion provided on a front side of a body of the image pickup apparatus not shown to which the lens barrel 10 is applied. On an inner side of the mount ring 22, the electrical substrate 23 implemented with a control circuit and the like on the lens barrel 10 side is fixedly arranged.

The rear-end exterior cover 21 which is a decorative member is fixedly arranged on a rear end of the exterior barrel unit 19 so as to cover an outer peripheral surface of a rear end edge portion of the exterior barrel unit 19 and an outer peripheral surface of the mount ring 22. Further, the fixed barrel 16 is inserted on an inner side of the exterior barrel unit 19. Here, the fixed barrel 16 is fixedly arranged integrally relative to (a fixed portion of a body barrel 25 of) the exterior barrel unit 19 with fastening members such as screws. According to the configuration, the exterior barrel unit 19 and the fixed barrel 16 are basic components (immovable portions) in the present lens barrel 10.

The first-group barrel 11 is inserted on an inner side of the exterior barrel unit 19. On an inner side of the first-group barrel 11, the cam barrel 12 is arranged in a state of freely rotating relative to the first-group barrel 11 and in a state of being capable of moving forward and backward in the direction along the optical axis O. On an inner side of the cam barrel 12, the fixed barrel 16 is inserted. That is, the cam barrel 12 is arranged in a state of freely rotating and freely moving forward and backward in the direction along the optical axis O in a space between the exterior barrel unit 19 and the fixed barrel 16.

Here, the exterior barrel unit 19 is configured mainly with the body barrel 25, a zoom barrel 26, a front cover 27, the focusing ring 28, the zoom ring 29, a zoom barrel rear-end-edge decorative ring 30 and the like as shown mainly in FIG. 4. Note that, in FIG. 4, the rear-end exterior cover 21 is shown together.

The body barrel 25 of the exterior barrel unit 19 is a first barrel member formed in an almost cylindrical shape and is a basic component member (an immovable member) of the exterior barrel unit 19. On a front of the body barrel 25, the front cover 27 as a decorative member for covering and hiding what are included in the exterior barrel unit 19 so as to prevent them from being exposed to outside, and decorating the exterior is fixedly arranged. Further, on an outer peripheral surface of the body barrel 25, the focusing ring 28 is arranged in a state of freely rotating around the optical axis O in a region close to a distal end.

Furthermore, on the outer peripheral surface of the body barrel 25, the zoom barrel 26 is arranged in a state of freely rotating around the optical axis O in a region closer to a rear end than the position where the focusing ring 28 is arranged. In a region close to a distal end on an outer peripheral surface of the zoom barrel 26, the zoom ring 29 is fixedly arranged. In a region closer to a rear end than the region where the zoom ring 29 is arranged, on the outer peripheral surface of the zoom barrel 26, the zoom barrel rear-end-edge decorative ring 30 is fixedly arranged.

Note that air holes passing between internal and external spaces of the body barrel 25 are provided on a peripheral surface of the body barrel 25 so as to allow air to come in and go out between inside and outside according to change in capacity of an internal space of the lens barrel 10 at a time of a zooming operation, though it is not especially shown.

The zoom barrel 26 is a second barrel member which rotates around an outer periphery of the body barrel 25 (the first barrel) and which has air holes 26a (through holes) between its outer peripheral surface and inner peripheral surface. That is, in a predetermined area on the outer peripheral surface of the zoom barrel 26, more specifically, in an area corresponding to a region close to the distal end and a region where the zoom ring 29 is arranged, a plurality of air holes 26a, which are plurality of through holes passing in a diameter direction of the zoom barrel 26, are formed as an array as shown in FIGS. 4, 7 and 8. As shown in FIG. 7, each of the plurality of air holes 26a has a section in a shape tapering from an opening on an outer peripheral surface side of the zoom barrel 26 toward an opening on an inner peripheral surface side of the zoom barrel 26 (see FIG. 8) so that an area of the outer periphery side opening is set larger than an area of the inner periphery side opening.

Further, on an outer periphery of the zoom barrel 26, a plurality of rib-shaped convex portions 26d are formed in a circumferential direction separately from one another so as to receive the zoom ring 29. Space portions 26e among the separate convex portions 26d are adapted to allow air which has flowed through the air holes 26a to pass through. Furthermore, a narrow circumferential surface 26f, which is a receiving portion for receiving an optical-axis-direction end portion of the zoom ring 29, is formed on the outer periphery of the zoom barrel 26, and notch portions 26g, parts of the circumferential surface 26f notched in the optical axis direction, are formed. Therefore, air existing inside the zoom ring 29 can flow through the air holes 26a, pass through the air holes 26a, the space portions 26e and the notch portion 26g and go out from the end portion of the zoom ring 29 to the outside. Further, external air can flow in a direction opposite to the air direction and enter the inside of the zoom ring 29.

The plurality of air holes 26a are covered by moisture permeable sheets 32 constituted by members having waterproof property and moisture permeability and formed in a sheet shape. The moisture permeable sheets 32 are moisture permeable members provided so as to cover the plurality of air holes 26a (through holes) of the zoom barrel 26 (the second barrel member). That is, the moisture permeable sheets 32 are, for example, constituted by a plurality of (three in the present embodiment) thin-rectangular-sheet-shaped members, which are formed so as to cover the outer peripheral surface of the zoom barrel 26 in the circumferential direction. The moisture permeable sheets 32 are adheringly fixed to predetermined regions on the outer peripheral surface of the zoom barrel 26, for example, with a double-sided adhesive tape or an adhesive. Moisture permeable members are applied to the moisture permeable sheets 32 as described above. A moisture permeable material, for example, Gore-Tex® is applied to the moisture permeable sheets 32.

The body barrel 25 is fixedly arranged integrally relatively to a fixed portion of the fixed barrel 16 with fastening members such as screws as described above. Thereby, the exterior barrel unit 19 and the fixed barrel 16 are integrally formed, and, when the lens barrel 10 is mounted on the image pickup apparatus not shown via the mount ring 22, the exterior barrel unit 19 and the fixed barrel 16 become fixed members (immovable members).

On the inner side of the exterior barrel unit 19, the first-group barrel 11 is inserted. On the inner side of the first-group barrel 11, the cam barrel 12 is inserted. Here, the cam barrel 12 is a driving member which receives rotation of the zoom ring 29 and zoom barrel 26 of the exterior barrel unit 19.

Therefore, on an outer peripheral surface of a rear-end edge portion of the cam barrel 12, a plurality of cam pins 12a are arranged in a state of projecting toward outside in the diameter direction. The plurality of cam pins 12a are formed at almost equal intervals in a circumferential direction. In the present embodiment, an example of providing three cam pins 12a is shown. Therefore, it is assumed that the respective cam pins 12a are arranged at intervals of an angle of about 120 degrees in the circumferential direction of the cam barrel 12.

On an inner peripheral surface of the zoom barrel 26 of the exterior barrel unit 19, a plurality of straight grooves 26b (see FIGS. 2, 4, 5 and the like) are formed at almost equal intervals in the circumferential direction so as to correspond to the cam pins 12a. In the present embodiment, three straight grooves 26b are provided. Further, on an inner peripheral surface of the body barrel 25 of the exterior barrel unit 19, a plurality of cam grooves 25a (see FIGS. 2, 4, 6 and the like) are formed at almost equal intervals in a circumferential direction. In the present embodiment, three cam grooves 25a are provided.

The plurality of cam pins 12a are engaged with the straight grooves 26b in a state of freely sliding after being inserted through the cam grooves 25a of the body barrel 25 of the exterior barrel unit 19. As described above, the zoom ring 29 is fixedly arranged relative to the zoom barrel 26. Therefore, according to the configuration, when the zoom ring 29 is rotated around the optical axis O by an operation by a user, the zoom barrel 26 integrally rotates in the same direction. When the zoom barrel 26 rotates, the zoom barrel 26 and the cam barrel 12 integrally rotate in the same direction because the cam pins 12a are engaged with the straight grooves 26b. At the same time, the cam barrel 12 moves forward or backward in the direction along the optical axis O while rotating relative to the body barrel 25 (the exterior barrel unit 19) because the cam pins 12a and the cam grooves 25a are cam-coupled.

Further, in a region close to a distal end on the inner peripheral surface of the cam barrel 12, a cam groove 12d (see FIG. 5) is formed. On an outer peripheral surface of the fixed barrel 16, a cam pin 16a (see FIG. 3) are arranged in a state of projecting toward outside so as to correspond to the cam groove 12d. The cam pin 16a is cam-coupled with the cam groove 12d. According to the configuration, when the cam barrel 12 rotates, the cam pin 16a on the fixed side relatively moves along the cam groove 12d. Therefore, the cam barrel 12 moves forward or backward in the direction along the optical axis O relative to the fixed barrel 16.

On the other hand, the first-group barrel 11 moves forward or backward in the direction along the optical axis O in response to rotation of the cam barrel 12. Therefore, on an inner peripheral surface of the first-group barrel 11, a plurality of cam grooves 11b (see FIG. 2) in a predetermined cam shape are formed. A plurality of cam pins 12b (see FIGS. 2 and 3) arranged in a region close to the distal end on the outer peripheral surface of the cam barrel 12 in a state of projecting toward outside are cam-coupled with the plurality of cam grooves 11b. Here, the plurality of cam grooves 11b are made to be in pairs, and a plurality of pairs (three pairs in the present embodiment) are formed at almost equal intervals in a circumferential direction. The plurality of cam pins 12b are also made to be pairs, and a plurality of pairs (three pairs in the present embodiment) are formed at almost equal intervals in the circumferential direction to correspond to the pairs of cam grooves 11b. Here, rotation of the first-group barrel 11 around the optical axis O is controlled by a configuration to be described later.

On the other hand, on the distal end region of the cam barrel 12, the second-group barrel 13 is arranged in a state of relatively freely rotating around the optical axis O relative to the cam barrel 12. Here, the cam barrel 12 and the second-group barrel 13 are connected by bayonet coupling. Therefore, the cam barrel 12 and the second-group barrel 13 can relatively freely rotate around the optical axis O and are configured to move integrally in the same direction when the cam barrel 12 moves forward or backward in the direction along the optical axis O.

As shown in FIG. 3, on an outer peripheral surface side of the second-group barrel 13, a plurality of (three in the present embodiment) pins 13a are arranged in a state of projecting toward outside at almost equal intervals in a circumferential direction. As shown in FIGS. 2 and 3, on an inner peripheral surface of the first-group barrel 11, a plurality of (three in the present embodiment) straight key grooves 11c linearly extending in the direction along the optical axis O are formed at almost equal intervals in the circumferential direction so as to correspond to the pins 13a. The plurality of pins 13a are engaged with the straight key grooves 11c, respectively. According to the configuration, rotation of the first-group barrel 11 around the optical axis O is controlled relative to the second-group barrel 13, but the first-group barrel 11 is in a state of freely moving forward and backward in the direction along the optical axis O.

Therefore, as described above, by the cam barrel 12 being rotated, the second-group barrel 13 controls rotation of the first-group barrel 11 when the first-group barrel 11 moves forward or backward in the direction along the optical axis O while allowing rotation of the cam barrel 12, and the first-group barrel 11 is in a state of not rotating around the optical axis O. At the same time, accompanying forward or backward movement of the cam barrel 12 in the direction along the optical axis O, the second-group barrel 13 integrally moves forward or backward in the same direction.

In addition to the pins 13a, a straight groove 13b parallel to the optical axis direction is also formed on the second-group barrel 13. The straight groove 13b is engaged with a projection 16b formed on an inner peripheral surface of the fixed barrel 16. Relative movement of the second-group barrel 13 in the optical axis direction is allowed, but rotation is controlled (rotation is inhibited).

The cam pin 15a of the diaphragm device 15 is engaged with a straight groove 16c parallel to the optical axis direction provided on the fixed barrel and the cam groove 12c1. Relative movement of the diaphragm device 15 in the optical axis direction is allowed, but rotation is controlled (rotation is inhibited).

The cam pin 17a of the fourth-group barrel 17 is engaged with the straight groove 16c parallel to the optical axis direction provided on the fixed barrel and the cam groove 12c2. Relative movement of the fourth-group barrel 17 in the optical axis direction is allowed, but rotation is controlled (rotation is inhibited).

Further, similarly, the cam pin 18a of the fifth-group barrel 18 is engaged with the straight groove 16c parallel to the optical axis direction provided on the fixed barrel and the cam groove 12c3. Relative movement of the fifth-group barrel 18 in the optical axis direction is allowed, but rotation is controlled (rotation is inhibited).

Note that, in the lens barrel 10 of the present embodiment, a plurality of sealing members (51 to 57) are arranged for each main portion of each of the component members described above to realize a dustproof and waterproof structure. Note that reference numerals of the sealing members (51 to 57) are shown only in FIG. 2 in order to avoid complicatedness of drawings.

In FIG. 2, the sealing member 51 is a ring-shaped sealing member formed such that it surrounds the optical axis, which is sandwiched between the first-group barrel 11 and the first-group holding barrel 11a (a fixed part). The sealing member 52 is a sealing member sandwiched between the first-group barrel 11 and the exterior barrel unit 19 (a sliding part). The sealing members 53, 54 are ring-shaped sealing members formed such that they surround the optical axis, which are sandwiched between the focusing ring 28 and the body barrel 25 (a sliding part). Note that, though a part of a circumferential surface of the body barrel 25 which bears rotation of the focusing ring 28 is accurately a separate part as shown in FIGS. 1, 2 and 8, it does not matter to describe the part as an integral part integrated with the body barrel 25 with regard to its function, and, therefore, description is and will be made on that assumption.

The sealing member 55 is a sealing member sandwiched between the zoom barrel 26 and the body barrel 25 (a sliding part). In other words, the sealing member 55 is a first seal member provided between the zoom barrel 26 (the second barrel) and the body barrel 25 (the first barrel), at an end-portion opening of the zoom barrel 26 on a front side (a side close to the front cover 27) of the optical axis O.

The sealing member 56 is a sealing member sandwiched between the zoom barrel 26 and the rear-end exterior cover 21 (a sliding part). In other words, the sealing member 56 is a second seal member provided between the zoom barrel 26 (the second barrel) and the body barrel 25 (the first barrel), at an end-portion opening of the zoom barrel 26 on a rear side (a side close to the rear-end exterior cover 21) of the optical axis O.

The sealing member 57 is a sealing member sandwiched between the rear-end exterior cover 21 and the mount ring 22 (a fixed part).

As shown in FIG. 7 and as described above, the zoom barrel 26 has the plurality of air holes 26a in the predetermined area on its outer peripheral surface. In a region on the zoom barrel 26 where the plurality of air holes 26a are formed and the moisture permeable sheets 32 are arranged, concave portions 26c are formed where a diameter-direction section of the zoom barrel 26 from the outer peripheral surface toward the inner peripheral surface forms a concave shape. The plurality of concave portions 26c are formed over the outer peripheral surface of the zoom barrel 26, for example, in the form of dividing the circumference of the zoom barrel 26 equally into a plurality of portions.

For example, it is common that functional portions such as cam portions for driving and convex/concave portions for engagement with other component members are complicatedly arranged on inner peripheral surfaces or outer peripheral surfaces of fixed members, such as the body barrel 25, of the exterior barrel unit 19. It is difficult to uniformly provide a plurality of air holes and secure a large area for moisture permeable sheets on the fixed members (such as the body barrel 25) with such a structure.

In comparison, the zoom barrel 26 (a movable member, a rotation member) to which the zoom ring 29, a rotation operation member, is fixed and which is configured to rotate integrally with the zoom ring 29 has few such functional portions as described above on its inner peripheral surface or outer peripheral surface and is in a relatively simple shape. Therefore, it is possible to secure a relatively large uniform space for providing the plurality of air holes on the zoom barrel 26. Especially in a high-magnification zoom lens barrel, since change in internal capacity at a time of zooming is large, air holes with a larger area are required. Therefore, a configuration of providing a plurality of air holes in the zoom barrel 26 and providing moisture permeable sheets covering the air holes is advantageous.

As described above, according to the embodiment described above, the zoom barrel 26 in the lens barrel provided with a rotation operation member and having drip-proofness is a member which has few functional portions because the zoom barrel 26 is not directly engaged with a lens holding barrel and the like which move forward or backward in the direction along the optical axis O, and which is rotatably arranged, and, therefore, the zoom barrel 26 is formed in a relatively simple shape. Therefore, on the zoom barrel 26, the plurality of air holes 26a can be formed within a relatively large range uniformly. Further, it is possible to easily uniformly arrange the moisture permeable sheets 32 over spaces on an outer peripheral surface side or inner peripheral surface side of the plurality of air holes 26a.

Figure 9:
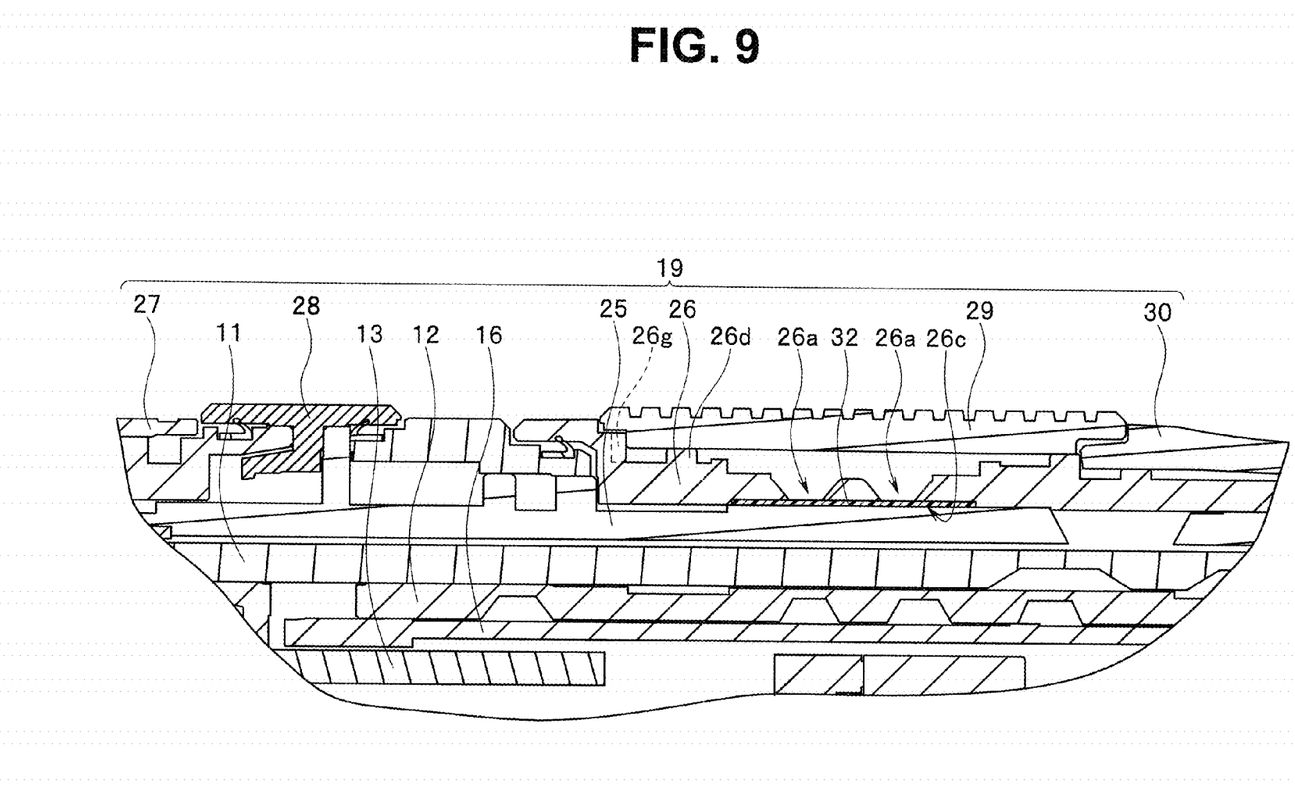
FIG. 9 shows a variation of arrangement of the moisture permeable sheets in the lens barrel of the embodiment of the present invention, and is an enlarged sectional view corresponding to FIG. 8.

Note that arrangement of the moisture permeable sheets 32 is not limited to the region shown as an example in the embodiment described above. For example, the moisture permeable sheets 32 can be arranged at a position shown in FIG. 9. FIG. 9 shows a variation of arrangement of the moisture permeable sheets in the lens barrel of the embodiment of the present invention, and is an enlarged sectional view corresponding to FIG. 8.

In the variation shown in FIG. 9, the moisture permeable sheets 32 are arranged on the inner peripheral surface side of the zoom barrel 26. Therefore, the present variation is different from the above embodiment (see FIG. 8) in that, in a configuration according to the present variation, the region where the moisture permeable sheets 32 are arranged is the region where the plurality of air holes 26a are formed on the zoom barrel 26, and the concave portions 26c are formed so that the diameter-direction section of the zoom barrel 26 from the inner peripheral surface toward the outer peripheral surface forms a concave shape. Other components are similar to those of the embodiment described above.

In the variation configured as described above, functions and operation obtained by arranging the moisture permeable sheets 32 over the air holes 26a are quite similar to the embodiment described above, and advantages obtained thereby are also similar.

Note that the present invention is not limited to the embodiment described above, and it goes without saying that various modifications and applications can be performed within a range not departing from the spirit of the invention. Furthermore, the above embodiment includes various stages of the invention, and various inventions can be extracted by appropriately combining a plurality of disclosed constituent features. For example, even if some constituent features are deleted from all the constituent features shown in the above embodiment, a configuration from which the constituent features have been deleted can be extracted as an invention if the problem to be solved by the invention can be solved, and the advantages of the invention can be obtained. The present invention is not restricted by a particular embodiment but is limited only by accompanying claims.

What is claimed is:

1. A lens barrel comprising:
   a first barrel member including a first air hole passing between internal and external spaces of the first barrel member;
   a second barrel member including a through hole constituted of a concave portion formed such that a diameter-direction cross-section from an outer peripheral surface toward an inner peripheral surface of the second barrel member forms a concave shape and a plurality of second air holes, the second barrel member being configured to rotate around an outer periphery of the first barrel member;

a moisture permeable member formed in a sheet shape and arranged at a position covering the concave portion or the plurality of second air holes of the second barrel member; and a rotation operation member arranged on the second barrel member in a fixed manner and configured to rotate together with the second barrel member, wherein the moisture permeable member has a predetermined width and arranged over substantially an entire circumference of the second barrel member, and even in a case where the second barrel member rotates by the rotation operation member, outside air comes into an inside of the first barrel member through the first air hole, the moisture permeable member, and the second air holes, or air inside the first barrel member which moves by a movement of a lens is discharged to outside.

2. The lens barrel according to claim 1, wherein each of the plurality of second air holes has a cross-section in a tapering shape on a cross-section in an optical axis direction of the lens so that an area of an outer periphery side opening is set larger than an area of an inner periphery side opening.

3. The lens barrel according to claim 1, wherein each of the plurality of second air holes has a cross-section in a tapering shape on a cross-section in an optical axis direction of the lens so that an area of an outer periphery side opening is set larger than an area of an inner periphery side opening, and the moisture permeable member is arranged on a bottom surface of the concave portion so as to cover the outer periphery side opening of each of the plurality of second air holes.

4. The lens barrel according to claim 1, wherein each of the plurality of second air holes has a cross-section in a tapering shape on a cross-section in an optical axis direction of the lens so that an area of an outer periphery side opening is set larger than an area of an inner periphery side opening, and the moisture permeable member is arranged so as to cover the inner periphery side opening of each of the plurality of second air holes.

* * * * *